No. 844,254. PATENTED FEB. 12, 1907.
R. H. COURTNEY, Jr.
MEGAPHONE ATTACHMENT FOR STEAM WHISTLES.
APPLICATION FILED OCT. 2, 1906.
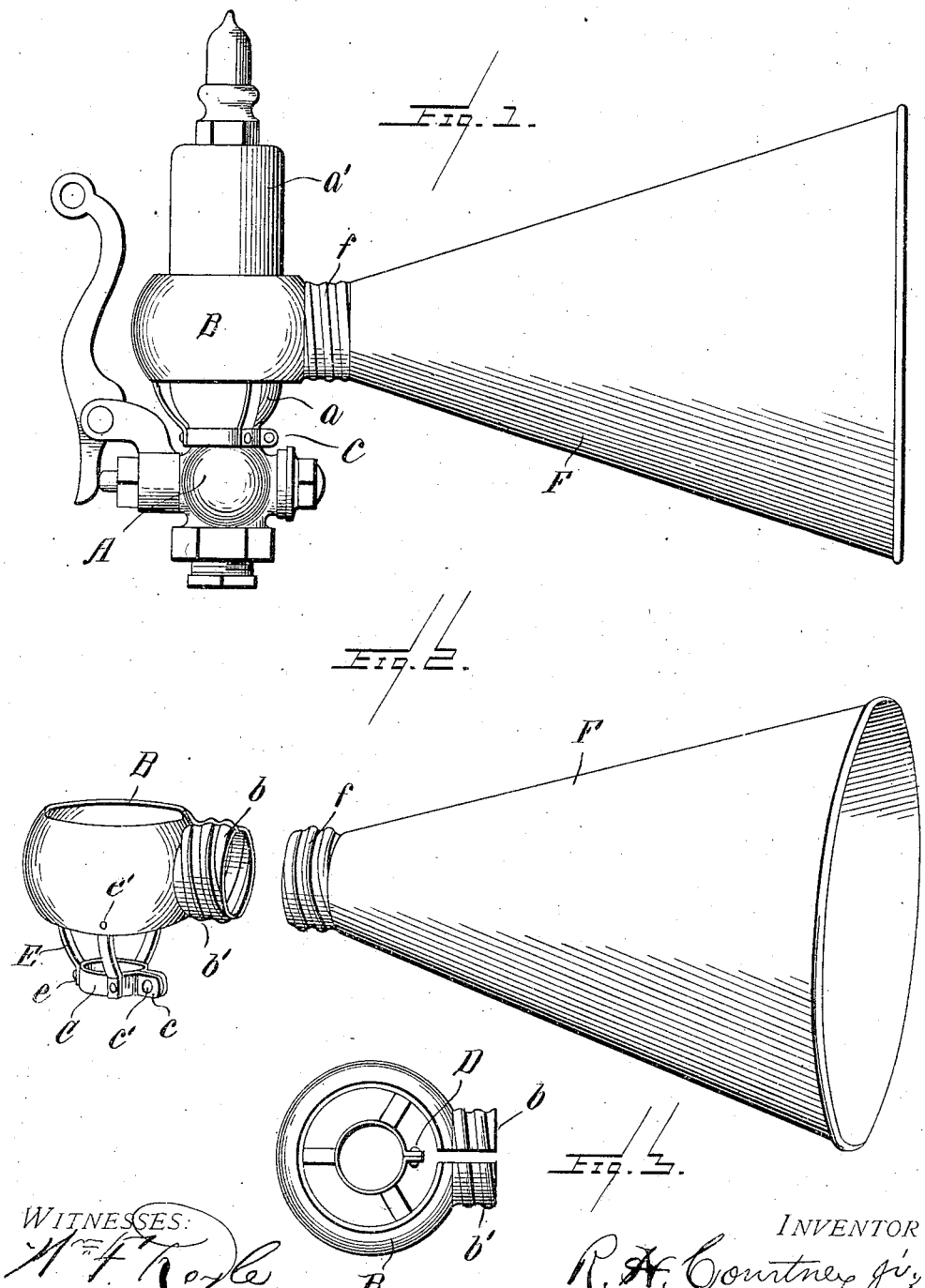

UNITED STATES PATENT OFFICE.

ROBERT HUGH COURTNEY, JR., OF LOUISVILLE, KENTUCKY.

MEGAPHONE ATTACHMENT FOR STEAM-WHISTLES.

No. 844,254. Specification of Letters Patent. Patented Feb. 12, 1907.

Application filed October 2, 1906. Serial No. 337,065.

*To all whom it may concern:*

Be it known that I, ROBERT HUGH COURTNEY, Jr., a citizen of the United States, residing at Louisville, in the county of Jefferson and State of Kentucky, have invented certain new and useful Improvements in Megaphone Attachments for Steam-Whistles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to new and useful improvements in the class of megaphone attachments for compressed-air and steam whistles, and consists of the novel construction hereinafter described.

My improved device is especially adapted for use on interurban street-cars, steamboats, &c., and in fact in any connection where there is not too great a vibration of the whistle.

In the accompanying drawings I have clearly illustrated my improved device, and a full and exact description thereof is contained in the annexed specification.

In the accompanying drawings, Figure 1 is a side elevation of a whistle with my improved device applied thereto. Fig. 2 is a perspective view of my device, showing the parts thereof disconnected; and Fig. 3 is a top plan view of a portion of my device.

In the several views like letters of reference designate similar parts of my device.

A, in the drawings, designates a steam or air whistle of ordinary construction and provided with the usual cups $a$ and $a'$, and B a circular casing inclosing the annular opening between the cups $a$ and $a'$ of the whistle A. This casing B preferably comprises a piece of transversely-curved sheet metal, bent longitudinally into a circular form, of sufficient diameter as not to come in contact with the cups of the whistle and having its ends bent outwardly to form a circular projection $b$, which projection is provided with screw-threads $b'$.

C is a circular collar adapted to fit around the base of the cup $a$, the ends $c$ thereof being bent outwardly and provided with orifices $c'$ $c'$, one of said orifices being internally threaded to receive the end of a locking-screw D, by means of which said collar is retained in position.

E E E are curved arms, riveted at one end to the collar C at $e$ and at their other end to the casing B at $e'$.

F is a megaphone of ordinary construction and provided with the screw-threaded socket portion $f$, adapted to fit onto the threaded portion $b$ of the casing B.

With this construction it is obvious that the sound from the whistle will pass through the megaphone with the usual result, and it is apparent that my device may be readily attached to and detached from the whistle, and can be adjusted by means of the screw D to fit different-size whistles.

What I claim is—

1. The combination with a whistle made up of a plurality of cup-sections, of a casing having an annular chamber inclosing the space between said sections of said whistle and provided with an orifice, a hollow screw-threaded projection on said casing adjacent to and in line with said orifice, a detachable collar on said whistle, arms connecting said collar and said casing and a megaphone having a threaded socket adapted to fit onto said threaded projection on said casing, substantially as described.

2. In combination with a whistle having a plurality of cup-sections, a clamping-band adapted to be fastened about the neck of one of said sections, a split shell, and connections between the same and said band, said shell surrounding the meeting ends of said sections and spaced therefrom, the ends of said shell being threaded, and a megaphone having threads at its tapered end designed to engage the threaded ends of said shell and hold the same together, as set forth.

In testimony whereof I hereunto affix my signature in the presence of two witnesses.

ROBERT HUGH COURTNEY, JR.

Witnesses:
MENEFEE WIGMAN,
A. Y. FORD.